United States Patent
Müller et al.

(10) Patent No.: US 9,977,929 B2
(45) Date of Patent: May 22, 2018

(54) COMMUNICATION DEVICE FOR IDENTIFYING AND/OR LOCATING AN RFID TRANSPONDER

(71) Applicant: SIEMENS AKTIENGESELLSCHAFT, München (DE)

(72) Inventors: Dominikus Joachim Müller, Eichenau (DE); Andreas Ziroff, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days. days.

(21) Appl. No.: 15/110,065

(22) PCT Filed: Nov. 10, 2014

(86) PCT No.: PCT/EP2014/074131
§ 371 (c)(1),
(2) Date: Jul. 6, 2016

(87) PCT Pub. No.: WO2015/104078
PCT Pub. Date: Jul. 16, 2015

(65) Prior Publication Data
US 2016/0357997 A1 Dec. 8, 2016

(30) Foreign Application Priority Data
Jan. 7, 2014 (DE) ........................ 10 2014 200 037

(51) Int. Cl.
*G06K 7/10* (2006.01)
(52) U.S. Cl.
CPC ..... *G06K 7/10029* (2013.01); *G06K 7/10009* (2013.01)

(58) Field of Classification Search
CPC .......... G06K 7/10029; G06K 7/10009; G06K 7/0008; G06K 7/10356; G01S 11/06;
(Continued)

(56) References Cited

U.S. PATENT DOCUMENTS 7,527,196 B2 * 5/2009 Murofushi ............. G06Q 20/20
235/375
8,872,633 B2 * 10/2014 Stewart ................ G06K 7/0008
340/10.2
(Continued)

FOREIGN PATENT DOCUMENTS

| CN | 101866499 A | 10/2010 |
|---|---|---|
| CN | 102421207 A | 4/2012 |

OTHER PUBLICATIONS

German Search Report for related German Application No. 10 2014 200 037.8 dated Mar. 13, 2014, with English Translation.
(Continued)

*Primary Examiner* — Ali Neyzari
(74) *Attorney, Agent, or Firm* — Lempia Summerfield Katz LLC

(57) ABSTRACT

A communication device is provided for identifying and/or locating an RFID transponder. The communication device includes a first RFID reader and at least one second RFID reader. The first and/or the at least one second RFID reader is configured to send out a query signal to the RFID transponder and to receive a response signal from the RFID transponder. The communication device also includes a trigger device configured to send a trigger signal to the first and/or the at least one second RFID reader, and as a result of which, the first and/or the at least one second RFID reader is configured to send out the query signal.

14 Claims, 3 Drawing Sheets

(58) Field of Classification Search
CPC ........ G01S 13/751; G01S 13/878; G01S 5/14; G06Q 20/20; G06Q 30/06; G07G 1/0045
USPC .................................................. 340/5.1, 10.4
See application file for complete search history.

(56) References Cited

U.S. PATENT DOCUMENTS

| | | | |
|---|---|---|---|
| 2006/0208857 A1* | 9/2006 | Wong | F41C 33/0209 340/5.82 |
| 2006/0261161 A1 | 11/2006 | Murofushi et al. | |
| 2008/0150692 A1 | 6/2008 | Missimer et al. | |
| 2008/0165007 A1 | 7/2008 | Drago et al. | |
| 2008/0309490 A1 | 12/2008 | Honkanen et al. | |
| 2009/0085738 A1 | 4/2009 | Darianian et al. | |
| 2010/0052856 A1 | 3/2010 | Macauley et al. | |
| 2010/0156651 A1 | 6/2010 | Broer | |

OTHER PUBLICATIONS

Kubina Bernd et al; "A Coherent Multi-Reader Approach to Increase the Working Range of Passive RFID Systems"; IEEE International Conference on RFID—Technologies and Applications (RFID-TA); pp. 350-355, 2012.
PCT International Search Report and Written Opinion of the International Searching Authority dated Dec. 8, 2015 for corresponding PCT/EP2014/074131.
PCT International Search Report and Written Opinion of the International Searching Authority dated Jan. 29, 2015 for corresponding PCT/EP2014/074131.
Vales-Alonso J. et al; "Optimal scheduling in single channel dense reader RFID environments"; Fourth International EURASIP Workshop on RFID Technology (EURASIP RFID); pp. 14-21; 2012.
Chinese Office Action for related Chinese Application No. 201480072521.6 dated Nov. 30, 2017.

* cited by examiner

FIG 4

| R1 | R2 | R3 | R4 | R1/2* | R3/4* | R1/2/3/4 | not R1/2/3/4/ | R1/2 | R3/4 |
|----|----|----|----|-------|-------|----------|---------------|------|------|
| 0  | 0  | 0  | 0  | 0     | 0     | 0        | 1             | 0    | 0    |
| 0  | 0  | 0  | 1  | 0     | 0     | 0        | 1             | 0    | 0    |
| 0  | 0  | 1  | 0  | 0     | 0     | 0        | 1             | 0    | 0    |
| 0  | 0  | 1  | 1  | 0     | 1     | 0        | 1             | 0    | 1    |
| 0  | 1  | 0  | 0  | 0     | 0     | 0        | 1             | 0    | 0    |
| 0  | 1  | 0  | 1  | 0     | 0     | 0        | 1             | 0    | 0    |
| 0  | 1  | 1  | 0  | 0     | 0     | 0        | 1             | 0    | 0    |
| 0  | 1  | 1  | 1  | 0     | 1     | 0        | 1             | 0    | 1    |
| 1  | 0  | 0  | 0  | 0     | 0     | 0        | 1             | 0    | 0    |
| 1  | 0  | 0  | 1  | 0     | 0     | 0        | 1             | 0    | 0    |
| 1  | 0  | 1  | 0  | 0     | 0     | 0        | 1             | 0    | 0    |
| 1  | 0  | 1  | 1  | 0     | 1     | 0        | 1             | 0    | 1    |
| 1  | 1  | 0  | 0  | 1     | 0     | 0        | 1             | 1    | 0    |
| 1  | 1  | 0  | 1  | 1     | 0     | 0        | 1             | 1    | 0    |
| 1  | 1  | 1  | 0  | 1     | 0     | 0        | 1             | 1    | 0    |
| 1  | 1  | 1  | 1  | 1     | 1     | 1        | 0             | 0    | 0    |

COMMUNICATION DEVICE FOR IDENTIFYING AND/OR LOCATING AN RFID TRANSPONDER

CROSS-REFERENCE TO RELATED APPLICATIONS

This application is the National Stage of International Application No. PCT/EP2014/074131, filed Nov. 10, 2014, which claims the benefit of German Patent Application No. DE 102014200037.8, filed Jan. 7, 2014. The entire contents of these documents are hereby incorporated herein by reference.

BACKGROUND

The present embodiments relate to identifying and/or locating an RFID transponder.

With Radio-Frequency Identification (RFID) technology, objects may be identified and located. An RFID system includes an RFID transponder (e.g., \attached to an object). In addition, the RFID system includes one or more RFID readers, which may send out a corresponding query signal. The query signal is sent out in the form of an alternating magnetic field. This alternating field may also serve the purpose of supplying the RFID transponder with energy. In response to the query signal, the RFID transponder sends back a response signal to the RFID readers. Based on this signal, the RFID transponder may be clearly identified.

If there are a number of RFID readers in a space that are sending out query signals, a collision of the signals from the RFID readers and the RFID transponder may occur. If the query signals sent by a number of RFID readers arrive at the RFID transponder at different points in time, and a number of command sequences for reading out an identification are destructively overlaid, the necessary depth of modulation is not achieved and the identification may not be read out.

In this respect, US 2006/0261161 A1 describes a commodity information registering apparatus, which may include two RFID readers. The commodity information registering apparatus also includes a POS terminal with a processor, with which the RFID readers may be activated for sending out a query signal.

Moreover, US 2010/052856 A1 discloses an RFID system that serves for triangulation. The system may have three RFID readers and a control device, connected to the RFID readers. With the RFID readers, RFID transponders may be identified and located. Using the control device, the RFID readers may be sequentially activated in order to send out a query signal.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an RFID transponder may be identified and located more reliably.

The communication device according to one or more of the present embodiments for identifying and/or locating an RFID transponder include a first RFID reader and at least a second RFID reader. The first RFID reader and/or at least the second RFID reader for identifying and/or locating the RFID transponder send(s) out a query signal to the RFID transponder and receive(s) a response signal from the RFID transponder. The communication device also includes a triggering device configured to send a triggering signal to the first and/or at least the second RFID reader, as a result of which the first and/or at least the at least a second RFID reader send(s) out the query signal. Moreover, the triggering device is configured to check whether the first RFID reader and/or at least the second RFID reader is/are ready to send the query signal.

The triggering device may coordinate when the RFID readers send out the query signal to the RFID transponder. The triggering device may activate the RFID readers such that the RFID readers send out the query signal at the same time. This allows synchronous operation of a number of RFID readers to be possible. This operating mode of the communication device makes an increase in the field strength at a specific position in the space possible by the constructive overlaying of the signals that are sent out by the RFID readers distributed in the space. This method also allows the reading range of conventional passive RFID transponders (e.g., also referred to as RFID tags) to be increased significantly.

In addition, the signals for reading out items of information of the RFID transponder are sent at the same point in time, and thus, there is no collision of signals (e.g., sent by various RFID readers distributed in the space). The query signals sent by the coherent RFID readers are thus constructively overlaid to form a signal at an RFID transponder, and the required depth of modulation is achieved.

The triggering device is configured to check whether the first RFID reader and/or at least the second RFID reader is/are ready to send the query signal.

This allows the operating state of the RFID readers to be reliably checked with the triggering device. Only when the RFID readers are ready to send may the triggering signal be transmitted by the triggering device to the respective RFID readers. This allows reliable operation of the communication device to be possible.

The triggering device may be configured to send the triggering signal to the first and/or at least the second RFID reader at a predetermined point in time. In this way, a number of RFID readers may send out the query signal at the same time, and the query signal reaches the RFID transponder at the same time. This allows reliable prevention of collisions between the query signals of the individual RFID readers.

In one embodiment, the triggering device is configured to send the triggering signal to the first and/or at least the second RFID reader periodically. The first and/or at least the second RFID reader may also send a number of query signals or a series of query signals to the RFID transponder. For example, the number of query signals may be sent to the RFID transponder at equal time intervals. This allows reliable operation of the communication device to be possible.

In another embodiment, the first RFID reader and/or at least the second RFID reader has/have a first connection element for receiving the triggering signal. The RFID readers may also have a control unit. A first connection element or a first pin, with which the respective RFID reader is connected to the triggering device, may be provided on this control unit. This allows the triggering signal to be transmitted reliably from the triggering device to the respective RFID reader.

In a further embodiment, the first RFID reader and/or the at least a second RFID reader has/have a second connection element, at which a signal that describes whether the first RFID reader and/or the at least a second RFID reader is/are ready for sending out the query signal may be output. The RFID readers or corresponding control units may have a second connection or a second pin, at which a signal that characterizes whether the respective RFID readers are ready to send is respectively output. This allows the respective operating state of the RFID readers to be reliably inquired.

In a further embodiment, the triggering device is configured to check the presence of a data connection between the triggering device and the first RFID reader and a data connection between the triggering device and the at least a second RFID reader. In other words, the triggering device may check whether and how many RFID readers are connected to the triggering device.

In this way, the RFID readers may be reliably activated by the triggering device.

In a further embodiment, the first RFID reader includes the triggering device. In this embodiment, the functionality of the triggering device may be provided by one of the RFID readers. This reader may serve as a master RFID reader, and at least the second RFID reader may serve as a slave RFID reader. Consequently, no additional hardware is needed to provide the communication device.

In another embodiment, the communication network includes the communication device and at least one RFID transponder. In the communication network, the RFID transponder may be reliably identified and/or located.

The method according to an embodiment for identifying and/or locating an RFID transponder includes providing a first RFID reader, providing at least a second RFID reader, sending out a query signal to the RFID transponder, and receiving a response signal from the RFID transponder with the first and/or at least the second RFID reader for identifying and/or locating the RFID transponder. The method also includes sending a triggering signal by a triggering device to the first and/or at least the second RFID reader. As a result of this, the query signal is sent out by the first and/or at least the second RFID reader, and checking with the triggering device whether the first RFID reader and/or the at least a second RFID reader is/are ready to send the query signal.

The advantages and developments described above in connection with the communication device apply analogously to the communication network and to the method.

BRIEF DESCRIPTION OF THE DRAWINGS

FIG. 4 shows a table in which exemplary individual states of the circuit according to FIG. 3 are illustrated.

DETAILED DESCRIPTION

Figure 1:
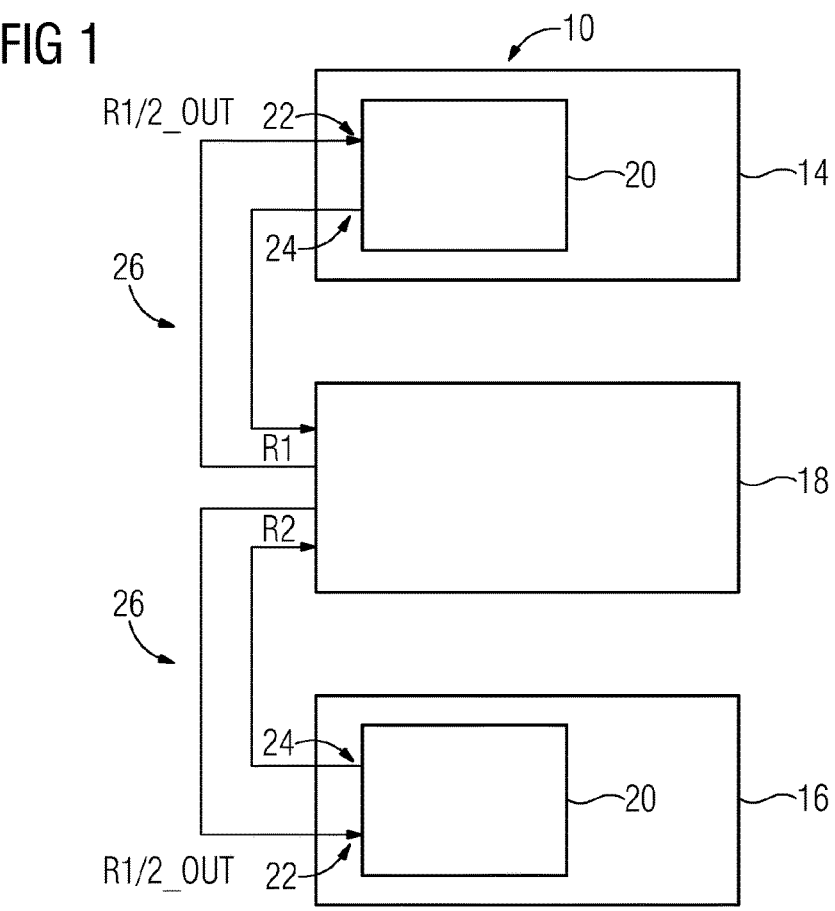
FIG. 1 shows a schematic representation of one embodiment of a communication device for identifying and/or locating an RFID transponder.

FIG. 1 shows a schematic representation of a communication device 10 for identifying and/or locating an RFID transponder 12. The communication device 10 includes a first RFID reader 14 and a second RFID reader 16 that may be structurally identical. The first RFID reader 14 and the second RFID reader 16 are configured to send one or more query signals to an RFID transponder 12. In addition, the first RFID reader 14 and the second RFID reader 16 are configured to receive a response signal from the RFID transponder 12. Based on the response signal, the RFID transponder 12 may be identified and/or located.

Figure 2:
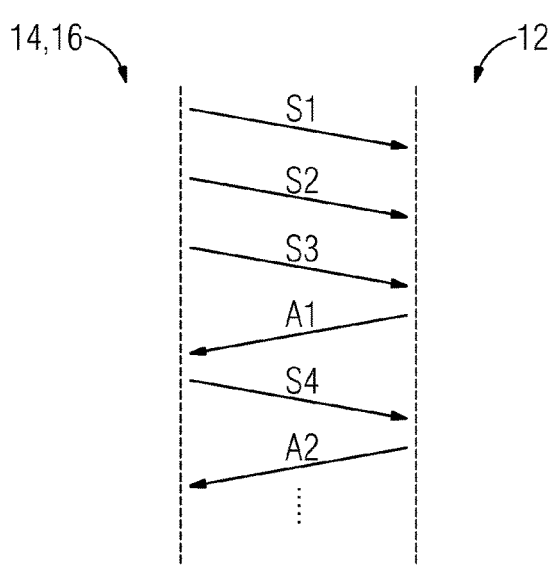
FIG. 2 shows a schematic representation based on which an exemplary transmission of query signals and response signals between RFID readers and the RFID transponder is illustrated.

FIG. 2 illustrates the command sequence between the first RFID reader 14 and the second RFID reader 16 and the RFID transponder 12 for identifying the RFID transponder 12. The identification takes place by reading out an identification referred to as an Electronic Product Code (EPC). The command sequence takes place in accordance with the EPC-Class-1 Gen-2 standard. Before an EPC is sent by the RFID transponder 12 to the first RFID reader 14 and the second RFID reader 16 distributed in the space, three query signals S1, S2 and S3 are sent by the first RFID reader 14 and the second RFID reader 16 to the RFID transponder 12. The first query signal S1 corresponds to the command "Select," the second query signal S2 corresponds to the command "Query," and the third query signal S3 corresponds to the command "Query-Rep." The RFID transponder 12 acknowledges these three commands or query signals S1, S2, S3 with a first response signal A1 (also referred to as RN16). Acknowledgement is followed by another query signal that is sent by the first RFID reader 14 and the second RFID reader 16 (also referred to as ACK RN16). Only then is the EPC transmitted by the RFID transponder 12 to the first RFID reader 14 and the second RFID reader 16 in the response signal A2.

If the first RFID reader 14 and the second RFID reader 16 send the query signals S1 to S4 to the RFID transponder 12 at different points in time, collisions between the signals may occur. In addition, the necessary depth of modulation may not be achieved (e.g., if the query signals S1 to S4 sent by the RFID readers 14, 16 arrive at the RFID transponder 12 at different points in time). In order to make synchronous operation of the first RFID reader 14 and the second RFID reader 16 possible, the query signals S1 to S4 are to be sent out by the first RFID reader 14 and the second RFID reader 16 at the same point in time.

For this purpose, the communication device 10 represented in FIG. 1 may include a triggering device 18 configured to send a triggering signal R1/2_OUT to the respective control units 20 of the first RFID reader 14 and the second RFID reader 16. As a result of the triggering signal, the first RFID reader 14 and the second RFID reader 16 send out the query signal or the query signals S1 to S4. For this, the first RFID reader 14 and the second RFID reader 16 or corresponding control units 20 have a first connection element 22 or a pin that represents a signal input for the triggering signal R1/2_OUT. In addition, the control units 20 have a second connection element 24, at which a signal R1, R2 that describes whether the respective RFID reader 14, 16 is ready to send out the query signal S1 to S4 may be output. The first RFID reader 14 and the second RFID reader 16 may be respectively connected to the triggering device 18 by a coaxial cable 26. The control units 20 of the RFID readers may, for example, be provided by a microcontroller.

Figure 3:
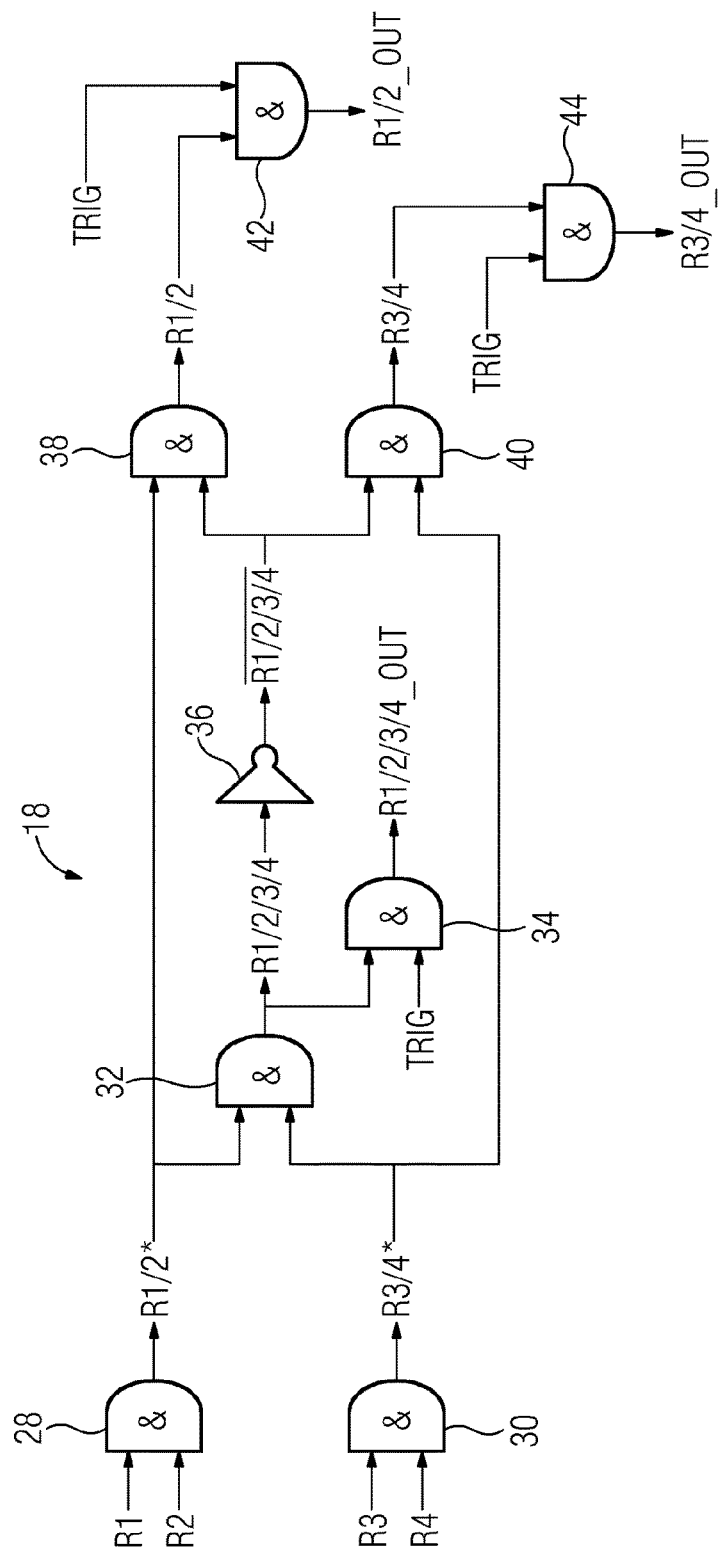
FIG. 3 shows one embodiment of a circuit of a triggering device of the communication device.

FIG. 3 shows a circuit of the triggering device 18 (e.g., four RFID readers 14, 16 are used). When the RFID readers 14, 16 are ready to send out the query signals S1 to S4, a logical 1 is output at a respective second connection element 24. This is illustrated by the signals R1, R2, R3 and R4. As soon as an RFID reader 14, 16 is about to send in the program run, the respective signal R1, R2, R3 or R4 is output. The RFID reader 14, 16 remains at this point in the program run until a second RFID reader 14, 16 sets a status to logical 1. When the first two RFID readers 14, 16 are ready to send, the signal R1/2* to (R1/2*=R1 & R2) is at the output of the first AND gate 28. When the third and the fourth RFID readers 14, 16 are ready to send, the signal R3/4* to (R3/4*=R3 & R4) is at the output of the second AND gate 30.

The signals R1/2* and R3/4* are fed to a third AND gate 32. If all of the RFID readers 14, 16 are ready to send, the signal R1/2/3/4 to (R1/2/3/4=R1/2* & R3/4*) is at the output of the third AND gate 32. This signal is fed to the input of a fourth AND gate 34. If this signal and, at the same time, a trigger signal TRIG are at the fourth AND gate 34, the signal R1/2/3/4_OUT is output. As a result of this, all of the RFID readers send out the query signal S1 to S4. The trigger signal TRIG may, for example, be provided by a switch (e.g., with which the triggering device 18 may be activated and deactivated).

In addition, the signal R1/2/3/4 is fed to a NOT gate 36. The output of this (NOT R1/2/3/4) is connected to a fifth AND gate 38 and a sixth AND gate 40. When the signals R1/2* and NOT R1/2/3/4 are at the input of the fifth AND gate 38, the signal R1/2 is output at the output of the fifth AND gate 38 (R1/2=R1/2* & NOT R1/2/3/4). The output of the AND gate 38 is connected to the input of the seventh AND gate 42, which, as a further input, receives the trigger signal TRIG. When these two signals are at the AND gate 42, the triggering signal R1/2_OUT is output. As a result of the triggering signal, the first RFID reader 14 and the second RFID reader 16 send out the query signals S1 to S4. If the signals R3/4* and NOT R1/2/3/4 are at the input of the sixth AND gate 40, the signal R3/4 is output at the output of the sixth AND gate 40 (R3/4=R3/4* & NOT R1/2/3/4). The output of the AND gate 40 is connected to the input of the eighth AND gate 44, which as a further input, receives the trigger signal TRIG. If these two signals are at the AND gate 44, the triggering signal R3/4_OUT is output. As a result of the triggering signal, the third and the fourth RFID readers send out the query signals S1 to S4.

With the circuit represented, it is also checked whether further RFID readers 14, 16 are connected. If this is not the case, then the output R1/2_OUT may be set to logical 1, and consequently the respective first connection element 22 may be set to logical 1. The RFID readers then continue in the program sequence. After that, the values R1, R2, R3 or R4 are set to logical 0 at the second connection element 24. With this circuit, either two or four RFID readers 14, 16 may be connected (e.g., without making any changes to the hardware). If three RFID readers 14, 16 are used in the present exemplary embodiment, the fourth input may be manually set to logical 1.

In the table according to FIG. 4, the states of the triggering device 18 are shown (e.g., all of the output possibilities (R1/2, R3/4, R1/2/3/4)) dependent on the combination of input signals (R1, R2, R3, R4). By the negation of the overall result (NOT R1/2/3/4) and the comparison with the interim results R1/2* and R3/4*, it is detected how many RFID readers 14, 16 are connected or at which inputs the RFID readers 14, 16 are connected. The triggering device 18 may be activated or deactivated by the trigger signal TRIG (e.g., provided by a simple switch). The circuit shown is configured for up to four RFID readers 14, 16 and by being reproduced, may be extended for operation with more than four RFID readers.

The hardware implementation of the triggering device 18 based on logic components may be provided using a dedicated microcontroller, whereby the interrogation of the connection elements and inquiry of the logical states according to the table may be implemented by software. It is advantageous that one software version is sufficient for all of the connected RFID readers. Standardized software versions, which are to be modified at a small number of locations in the program code at which a command for sending a modulated signal is provided, may be used. The program code is then extended to the extent that, before the sending of a modulated signal, a defined pin is checked or interrogated for a logical state and a logical state of a defined pin is changed.

As a further embodiment, the two RFID readers 14, 16 may be connected to one another with corresponding lines. In the case of this embodiment, one of the RFID readers 14, 16 acts as a master reader, and the other of the RFID readers 14, 16 acts as a slave reader. The evaluation of the logic states takes place by the master reader. During the program run, for reading out the EPC, the slave reader notifies the master reader with the second connection element 24 when the slave reader would like to send the corresponding query signals S1 to S4. The master reader notifies the slave reader with the first connection element 22 when it may send these signals (e.g., precisely when the master reader would also like to send these commands). In the case of this variant, two different software versions are provided for the control units 20 of the RFID readers. In addition, corresponding connection elements 22, 24 may be provided on the master reader.

In the case of a third embodiment, a triggering signal (e.g., in the form of a computing pulse that is at a pin of the respective control units 20) is used. As soon as the triggering signal is detected by the control unit 20, the sending out of the query signal S1 to S4 is begun (e.g., at the beginning of the command sequence). After a certain time, which may be set, a further triggering signal takes place, whereby the next modulated sending signal according to the sequence is sent, and so on. For the third embodiment, a triggering device 18 is likewise to be provided in order to be able to output a triggering signal with a defined frequency and pulse width. In addition, the RFID reader 14, 16 is to have a first connection element 22.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A communication device for identifying, locating, or identifying and locating a RFID transponder, the communication device comprising:
   a first RFID reader;
   a second RFID reader, wherein the first RFID reader, the second RFID reader, or the first RFID reader and the second RFID reader send out a query signal to the RFID transponder and receive a response signal from the RFID transponder; and
   a triggering device configured to send a triggering signal to the first RFID reader, the second RFID reader, or the first RFID reader and the second RFID reader, wherein, as a result of the triggering signal, the first RFID reader, the second RFID reader, or the first RFID reader and the second RFID reader send out the query signal, and wherein the triggering device is configured to check whether the first RFID reader, the second RFID reader, or the first RFID reader and the second RFID reader are ready to send the query signal.

2. The communication device of claim 1, wherein the triggering device is configured to send the triggering signal to the first RFID reader, the second RFID reader, or the first RFID reader and the second RFID reader at a predetermined point in time.

3. The communication device of claim 1, wherein the triggering device is configured to send the triggering signal to the first RFID reader, the second RFID reader, or the first RFID reader and the second RFID reader periodically.

4. The communication device of claim 1, wherein the first RFID reader, the second RFID reader, or the first RFID reader and the second RFID reader have a first connection element for receiving the triggering signal.

5. The communication device of claim 4, wherein the first RFID reader, the second RFID reader, or the first RFID reader and the second RFID reader have a second connection element at which a signal that describes whether the first RFID reader, the second RFID reader, or the first RFID reader and the second RFID reader are ready for sending out the query signal is outputtable.

6. The communication device of claim 1, wherein the triggering device is configured to check a presence of a data connection between the triggering device and the first RFID reader and a data connection between the triggering device and the second RFID reader.

7. The communication device of claim 1, wherein the first RFID reader comprises the triggering device.

8. A communication network comprising:
a RFID transponder; and
a communication device comprising:
a first RFID reader and a second RFID reader, wherein the first RFID reader, the second RFID reader, or the first RFID reader and the second RFID reader send out a query signal to the RFID transponder and receive a response signal from the RFID transponder; and
a triggering device configured to send a triggering signal to the first RFID reader, the second RFID reader, or the first RFID reader and the second RFID reader, wherein, as a result of the triggering signal, the first RFID reader, the second RFID reader, or the first RFID reader and the second RFID reader send out the query signal, and wherein the triggering device is configured to check whether the first RFID reader, the second RFID reader, or the first RFID reader and the second RFID reader are ready to send the query signal.

9. A method for identifying, locating, or identifying and locating a RFID transponder, the method comprising:
providing a first RFID reader;
providing a second RFID reader;
sending out a query signal to the RFID transponder and receiving a response signal from the RFID transponder with the first RFID reader, the second RFID reader, or the first RFID reader and the second RFID reader for identifying, locating, or identifying and locating the RFID transponder; and
sending a triggering signal by a triggering device to the first RFID reader, the second RFID reader, or the first RFID reader and the second RFID reader, wherein as a result of the triggering signal, the query signal is sent out by the first RFID reader, the second RFID reader, or the first RFID reader and the second RFID reader, wherein checking with the triggering device comprises determining whether the first RFID reader, the second RFID reader, or the first RFID reader and the second RFID reader are ready to send the query signal.

10. The communication network of claim 8, wherein the triggering device is configured to send the triggering signal to the first RFID reader, the second RFID reader, or the first RFID reader and the second RFID reader periodically.

11. The communication network of claim 8, wherein the first RFID reader, the second RFID reader, or the first RFID reader and the second RFID reader have a first connection element for receiving the triggering signal.

12. The communication network of claim 11, wherein the first RFID reader, the second RFID reader, or the first RFID reader and the second RFID reader have a second connection element at which a signal that describes whether the first RFID reader, the second RFID reader, or the first RFID reader and the second RFID reader are ready for sending out the query signal is outputtable.

13. The communication network of claim 8, wherein the triggering device is configured to check a presence of a data connection between the triggering device and the first RFID reader and a data connection between the triggering device and the second RFID reader.

14. The communication network of claim 8, wherein the first RFID reader comprises the triggering device.

* * * * *